United States Patent
Zansky et al.

(10) Patent No.: US 7,464,292 B2
(45) Date of Patent: Dec. 9, 2008

(54) REDUNDANT POWER SYSTEM WITH NO LATENT SINGLE FAILURE POINT

(75) Inventors: Zoltan Zansky, San Carlos, CA (US); William F. M. Jacobsen, Sunnyvale, CA (US); Sandeep K. Shah, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 528 days.

(21) Appl. No.: 11/081,757

(22) Filed: Mar. 15, 2005

(65) Prior Publication Data

US 2006/0208572 A1 Sep. 21, 2006

(51) Int. Cl.
*G06F 11/00* (2006.01)

(52) U.S. Cl. .............................. 714/14; 714/22; 714/48; 714/57

(58) Field of Classification Search .................. 714/14, 714/22, 48, 57
See application file for complete search history.

(56) References Cited

U.S. PATENT DOCUMENTS

| | | | |
|---|---|---|---|
| 4,028,615 A | 6/1977 | Jansen et al. | |
| 4,459,437 A | 7/1984 | Gabry et al. | |
| 5,748,001 A | 5/1998 | Cabot | |
| 5,777,550 A | 7/1998 | Maltby et al. | |
| 5,881,215 A * | 3/1999 | Alft | 714/14 |
| 5,957,374 A | 9/1999 | Bias et al. | |
| 6,570,394 B1 | 5/2003 | Williams | |
| 6,747,369 B2 * | 6/2004 | Griffith et al. | 307/43 |
| 6,918,055 B2 * | 7/2005 | Williams | 714/27 |
| 7,042,221 B2 | 5/2006 | Carney et al. | |
| 7,152,175 B2 * | 12/2006 | Madany et al. | 713/340 |

* cited by examiner

*Primary Examiner*—Robert W Beausoliel, Jr.
*Assistant Examiner*—Charles Ehne
(74) *Attorney, Agent, or Firm*—Blakely, Sokoloff, Taylor & Zafman LLP

(57) ABSTRACT

A redundant power supply system with several individual power supplies, each connected to one of several power inlets. At least one power supply can be connected to a selectable one of the several power inlets by means of a steering network.

19 Claims, 8 Drawing Sheets

REDUNDANT POWER SYSTEM WITH NO LATENT SINGLE FAILURE POINT

BACKGROUND

Electrically-operated machines perform a wide range of functions, from the whimsical to the life-saving. All such machines share the common characteristic that they will not operate correctly without electrical power. Accordingly, as the purpose a machine serves becomes more important, so too are the measures taken to ensure that the machine's power source will not be interrupted.

General- and special-purpose computing devices commonly require direct current (DC) power at several voltages. These voltages are produced by a system component called a power supply, which typically converts electrical energy from the alternating current (AC), high voltage form in which it is often delivered, to the lower DC voltages used by the device. Power supplies are rated in terms of the maximum power they can supply at their output voltages. The cost of a power supply is roughly proportional to its rated power: a 100 watt (W) supply may cost approximately half as much as a 200 W supply.

In order to protect a computing device against power failures, a common technique is to install two or more identical power supplies with their individual DC outputs paralleled, each capable of providing the full amount of power required by the device, and each connected to a separate incoming power circuit. This approach is shown in FIG. 2. There, a first power supply 140 may be connected to an ordinary wall socket 110 providing power at 120 VAC or 240 VAC at 50 or 60 Hz, while a second power supply 160 may be connected to an uninterruptible power supply (UPS, not shown), through connection 120. The UPS may provide a similar voltage generated from energy stored in batteries. If either the wall socket or UPS fails, or if either the first or second power supply fails, the computing device will continue to receive the power it needs.

Unfortunately, providing fully-redundant power supplies in this manner is expensive: two supplies cost twice as much as one. Furthermore, although the incoming power circuits may be indistinguishable in terms of their voltage and frequency, one may be more expensive to use than another. For example, a power supply that draws its input continuously from a UPS may require a more capable (and more expensive) UPS, or may cause the UPS's batteries to wear out more quickly.

SUMMARY OF THE INVENTION

Embodiments of the invention use a plurality of power supplies to provide reliable power to a load. Each power supply receives input power from one of several power inlets. At least one power supply can receive its input power from a selectable one of the several power inlets. Other aspects of the invention will be apparent from the accompanying figures and from the detailed description which follows.

BRIEF DESCRIPTION OF DRAWINGS

Embodiments of the invention are illustrated by way of example and not by way of limitation in the accompanying figures. In those figures, like reference numbers indicate similar elements.

DETAILED DESCRIPTION

Embodiments of the invention use three or more power supplies to provide reliable power to a load such as a general- or special-purpose computer system. Each power supply may be rated at less than the total power required by the load. At least one of the power supplies can obtain its incoming electrical power from one of at least two sources, through a switching network. The switching network can be tested using a technique such as described in co-pending application Ser. No. 11/081,264 filed on Mar. 15, 2005, which was issued on Apr. 24, 2007 as U.S. Pat. No. 7,208,955, to eliminate a latent single-point failure source.

Figure 1:
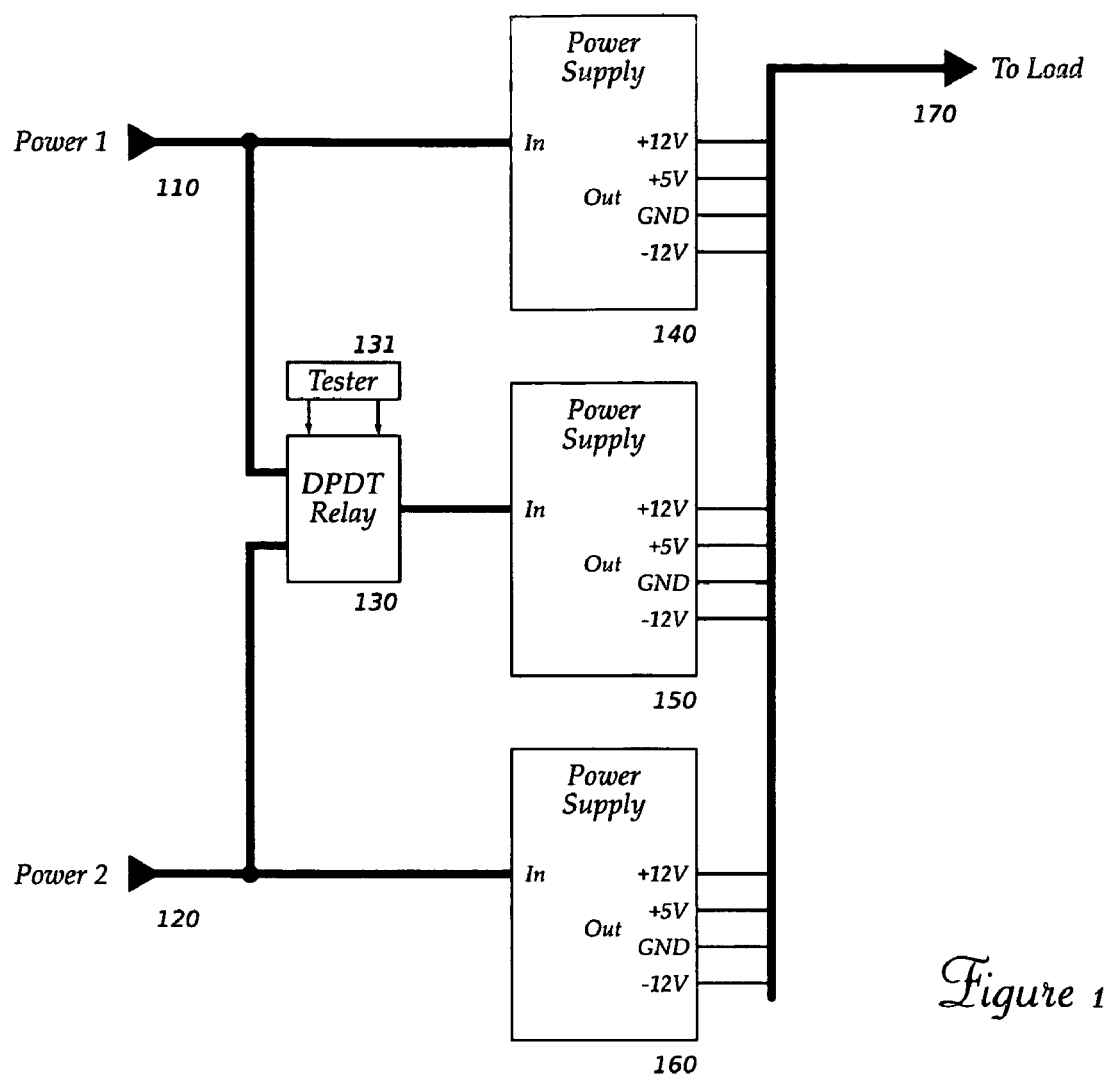
FIG. 1 shows a simple embodiment of the invention with two power inlets and three power supplies, where one supply can receive its input power from either of the two inlets.
Figure 2:
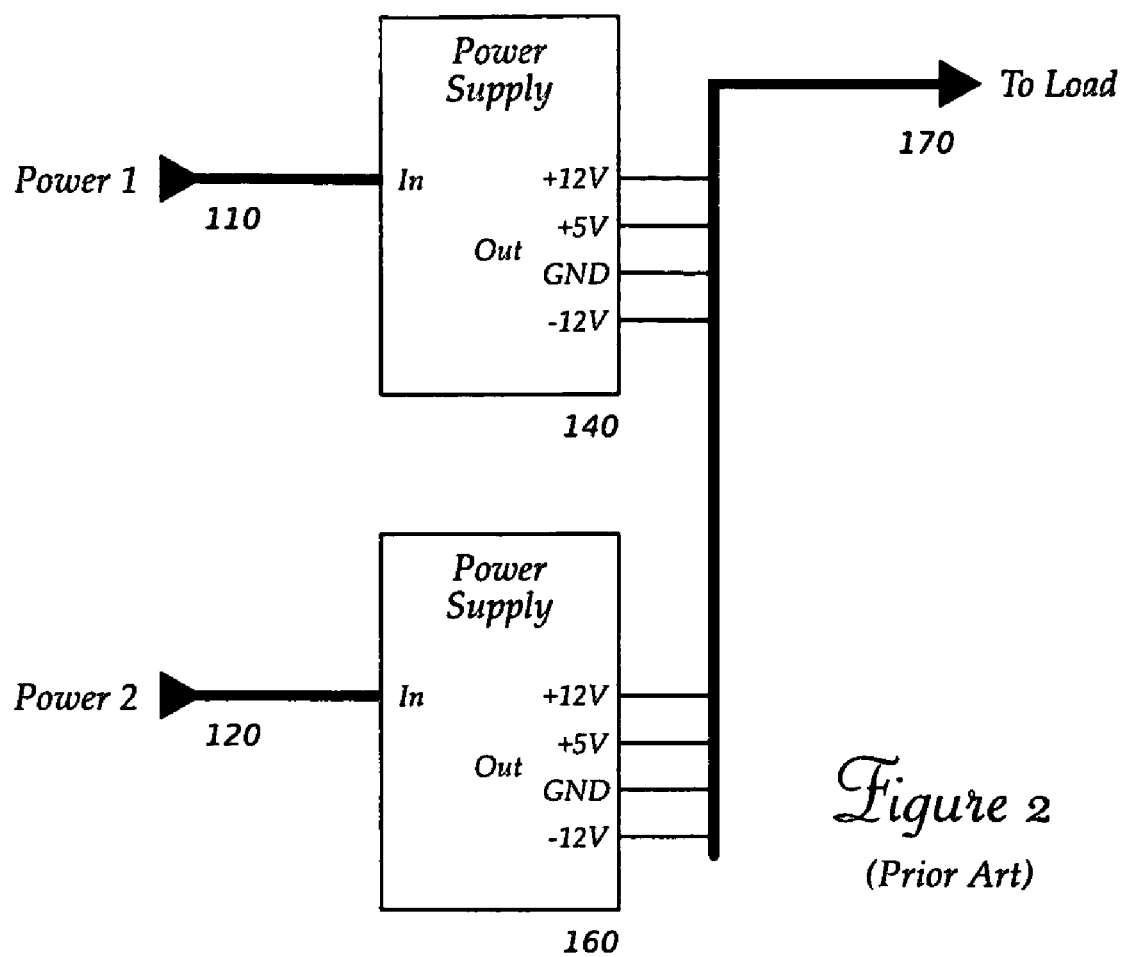
FIG. 2 shows a prior-art approach to providing redundant power.

A simple embodiment of the invention is shown in FIG. 1. There, a plurality of power supplies 140, 150 and 160 receive electrical power in one form from one of power connections 110 or 120, and provide electrical power in another form to a load 170. Power connections 110 and 120 may provide power at any frequency (including DC input) and voltage that is within the input specifications of power supplies 140, 150 and 160, and the power supplies each convert the input power to a form expected by the load. Each supply provides a part of the power required by the load. In this example, the power supplies are shown providing three DC voltages (+12V, +5V, and −12V). Power supplies suitable for other loads may provide different output voltages.

In this figure, power supplies 140 and 160 are directly connected to one of input power 1 110 or input power 2 120, while power supply 150 receives its input power from a switching device, double-pole, double-throw (DPDT) relay 130, which selects one of power 1 110 or power 2 120 in response to a control signal (not shown). The operation of relay 130 should be tested periodically by tester 131 to detect relay failures before they cause broader system-level failure.

In this embodiment, each power supply need not provide 100% of the total power required by the load. If each supply has a maximum rating of 50% of the total, then any two supplies can meet the load's needs. Thus, any single supply can fail without adverse effect. In addition, since the cost of a power supply is roughly proportional to its capacity, three half-sized power supplies can provide the same degree of redundancy as two full-sized supplies, at a considerable cost savings. For example, if a load requires 500 W and a 500 W power supply costs $500, then redundancy achieved by installing two full-sized power supplies would cost $1,000. However, by applying an embodiment of the invention, redundancy could be achieved by installing three half-sized (250 W in this example) power supplies, at a cost of perhaps $750 ($250 per supply). The total system cost is reduced by 25% of the total two-supply arrangement, or 50% of the cost of one full-sized supply. Note that these supply ratings and prices are provided by way of example only, and are not intended to limit embodiments of the invention to the specific power ratings and prices mentioned.

The apparatus shown in FIG. 1 also permits continued operation if one of power sources 110 and 120 fails. In that event, the power supply connected directly to that power source will become inoperative, but relay 130 permits power supply 150 to be connected to the power source that is still available, and the two power supplies (either 140 and 150 or 150 and 160) that are connected to the remaining power source can provide the power required by the load. During the few milliseconds of relay switchover, the holdup capacitor within the power supply assures that the output DC power is not interrupted.

Without tester 131, however, relay 130 cannot be relied upon to switch the input of power supply 150 from power 1, 110, to power 2, 120, when necessary. Some possible failure modes of relay 130 are discussed with reference to FIG. 3.

Figure 3:
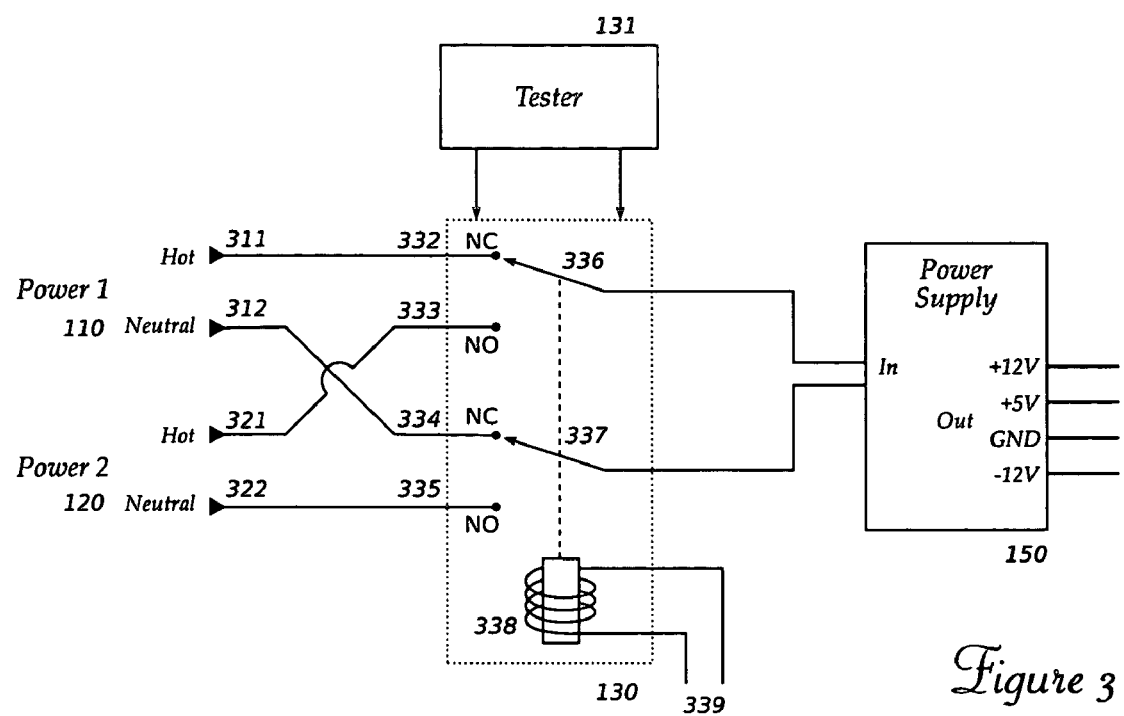
FIG. 3 shows an expanded view of a switching element in FIG. 1.

FIG. 3 shows a more detailed diagram of the device identified in FIGS. 1 and 4-7 as DPDT Relay. Power connections 110 and 120 are shown as comprising a hot connection 311 or 321 and a corresponding neutral connection 312 or 322. DPDT relay 130 contains two switches 336 and 337 that are mechanically connected so that they both move from a normally-closed (NC) position 332 or 334 to a normally-open (NO) position 333 or 335 in response to a control signal applied to coil 338 through signal lines 339. Tester 131, which may be an apparatus such as that disclosed in co-pending application Ser. No. 11/081,264 filed on Mar. 15, 2005, which was issued on Apr. 24, 2007 as U.S. Pat. No. 7,208,955, can detect failures in relay 130 that prevent switches 336 and 337 from moving as expected. For example, one or both of the switches can become welded to the NC or NO contact, or coil 338 can burn out or go open-circuited and fail to actuate switches 336 and 337. Without testing, some such failures can go undetected until one of power 1 and power 2 is interrupted, at which time the system will be unable to connect power supply 150 to the remaining power source, and the load may experience a power interruption. Such undetected failures are called latent single-point failures.

Several failure modes of relay 130 are latent because they cannot normally be detected without actually triggering the failure. This is because the power connections among which the relay selects may be essentially indistinguishable. For example, one power connection may draw power from one circuit in a structure, while the other connection may draw power from a different circuit in the structure. Such a configuration could prevent interruption of power to the load if one of the circuits became overloaded and a circuit breaker or fuse shut it down. However, a neutral line for either circuit could act as the return for the hot line of the other circuit, so if (for example) the neutral contact of the relay was welded in one position, the relay might appear to switch correctly from one power circuit to the other, but the system would fail if the power connection that provided the neutral line was actually disconnected.

In another common scenario, one power connection would run to a standard "wall current" circuit, and the other would run to a UPS. However, UPSes are generally designed to match wall current in voltage and phase, to prevent switching anomalies when the UPS must begin providing power from its batteries. It is possible that the wall current hot line could be returned through the UPS neutral, or vice versa, so that a welded contact as described above would not be detected during a switching test, but the load would see a power interruption if the power connection that did not run through the welded connector was disconnected.

To prevent power interruptions from these latent relay failures, an embodiment of this invention includes a testing apparatus capable of detecting the actual switching action. One suitable testing apparatus could couple a testing signal onto the relay contacts to be tested. A detector could analyze the signal passed through the relay to determine whether the contacts were open or closed. The testing signal should be distinguishable from the power signal simultaneously being passed through the same contacts, and should not interfere with the operation of the power supplies. For example, a small, high-frequency signal could be coupled into the relay by means of a first small capacitor, and the signal could be extracted and passed to a detector by means of a second small capacitor. The power supply could include an EME filter to reject the high-frequency testing signal. Other means of testing relay contacts for proper actuation may also be satisfactory. For example, an optical system could be employed to detect a physical movement of the relay contacts from one position to another.

Figure 4:
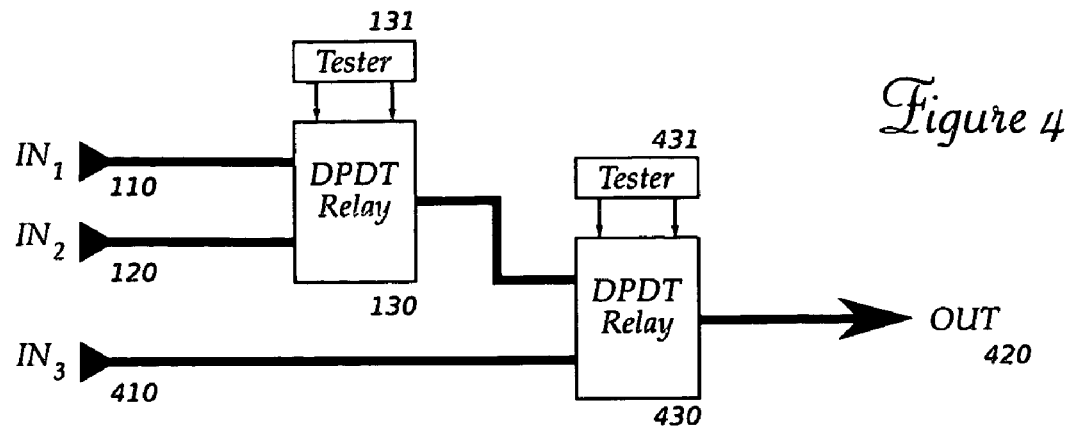
FIG. 4 shows alternative switching networks that permit selection from among three or more power sources.
Figure 4:
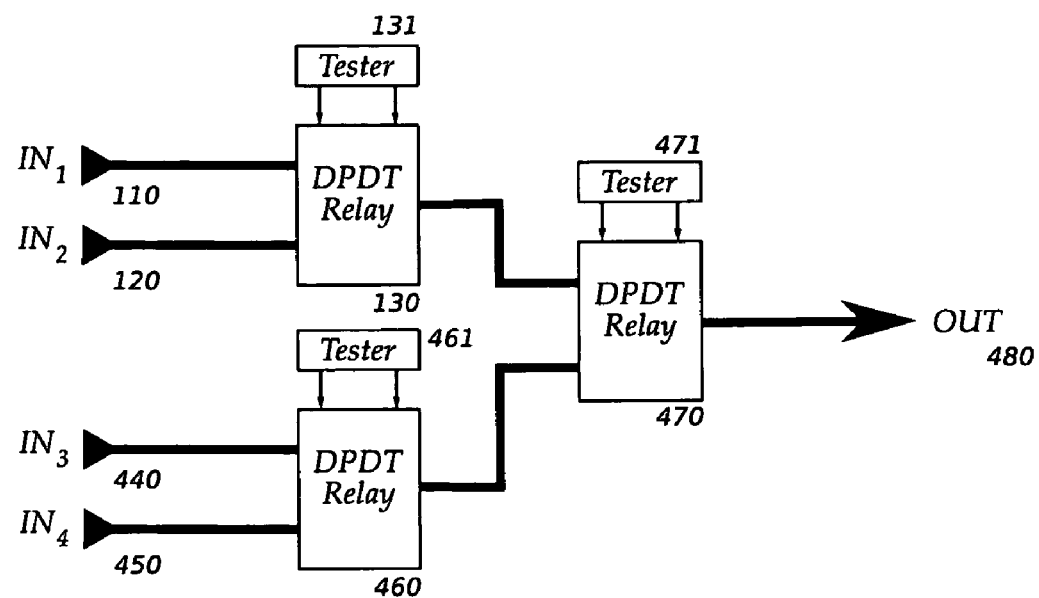
Figure 4:
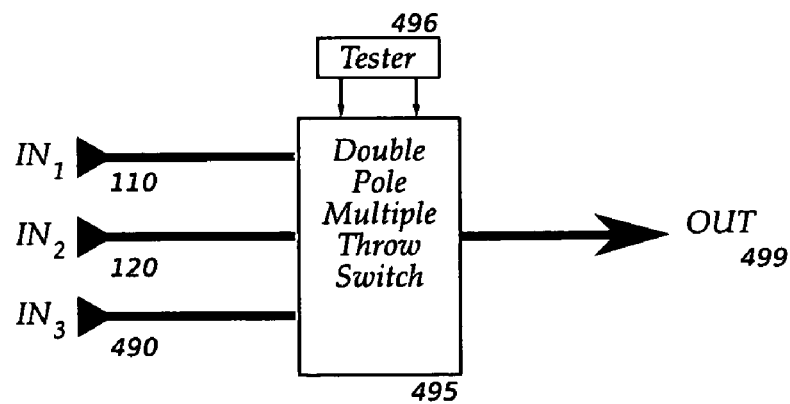

Although the embodiments shown in FIGS. 1 and 5-7 depict only two incoming power connections (always labeled 110 and 120 in each figure), other embodiments can accommodate more than two power connections. The three networks shown in FIG. 4 show how multiple relays can be used to select from among three or more power connections. These networks "steer" power from one of several inputs to the single output. Of course, each relay should be tested to avoid latent failures in the power selection networks. Furthermore, although DPDT relays appear in the embodiments described herein because of their easy availability and well-understood operational characteristics, other selection or steering devices could be used instead. For example, solid state relays are known in the art, and could replace electromagnetic DPDT relays in some embodiments.

Figure 5:
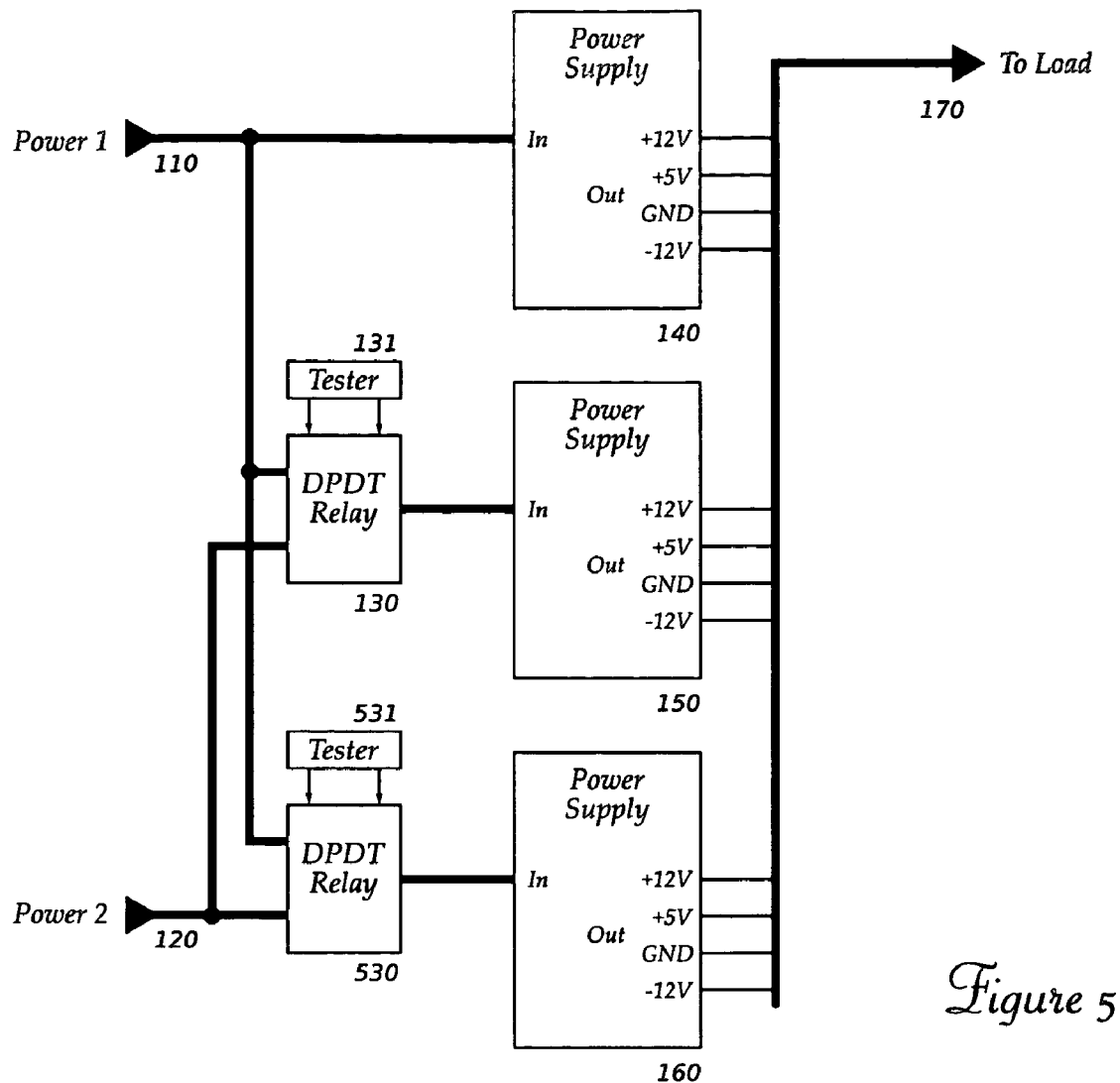
FIG. 5 shows another embodiment of the invention wherein two of three power supplies can select one of two power sources.

FIG. 5 shows another embodiment of the invention, where two of the three power supplies (150 and 160, but not 140) can be connected to either of two incoming power connections 110 and 120 through switching networks 130 and 530. In reliability simulations for particular estimates of mean time between failure (MTBF) for power sources, relays, coils and power supplies, this embodiment is expected to be approximately 1.8 times more reliable than the embodiment shown in FIG. 1.

Figure 6:
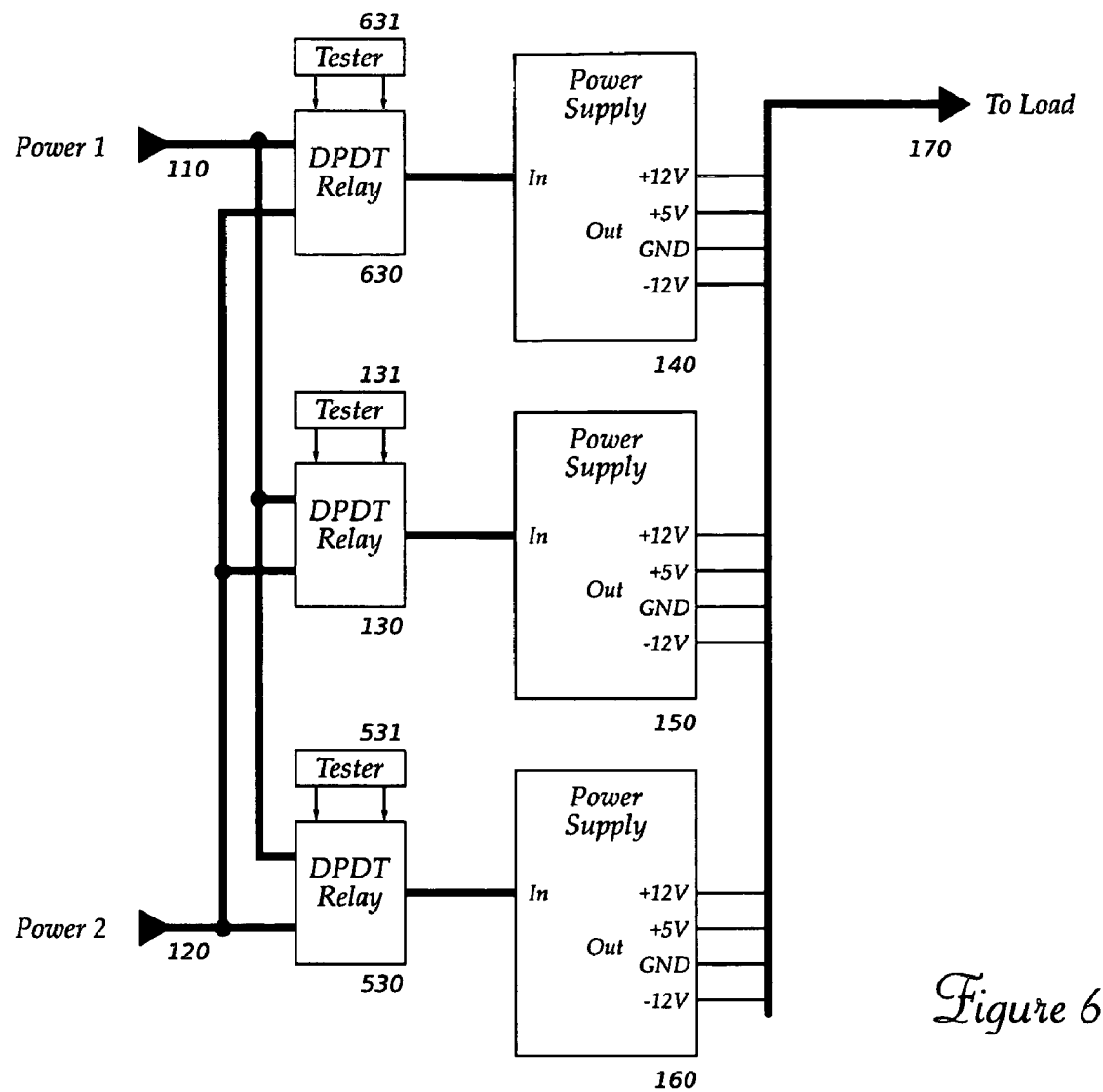
FIG. 6 shows another embodiment of the invention wherein each of three power supplies can select one of two power sources.

FIG. 6 shows another embodiment of the invention where each of the power supplies can be connected to either of two incoming power connections through a switching network. Reliability simulations show a slight gain in expected reliability over the embodiment of FIG. 5, but the gain may not outweigh the increased cost and complexity of adding a third relay and related testing circuitry.

Simulation and analysis of systems with more than one switching network, such as those shown in FIGS. 5 and 6, show exponential increases in reliability if the switching networks (DPDT relays) are hot-swappable, field-replaceable units ("FRU") and are replaced when the testing circuits detect problems, before a second switching network also develops problems. A field-replaceable unit is one that can be replaced without uninstalling the system and returning it to a manufacturing and/or repair depot for specialized maintenance work. In other words, a FRU can be replaced while the system remains in its normal operating environment, without special tools or facilities that may be difficult or impossible to bring to the system. A hot-swappable system component is one that can be removed and replaced while the system is in normal operation, without triggering a system failure or degraded performance. The combination of relay testers and field-replaceable relays that can be swapped without shutting down the system is a significant factor in increasing system availability, and is most effective in multi-relay circuits.

Figure 7:
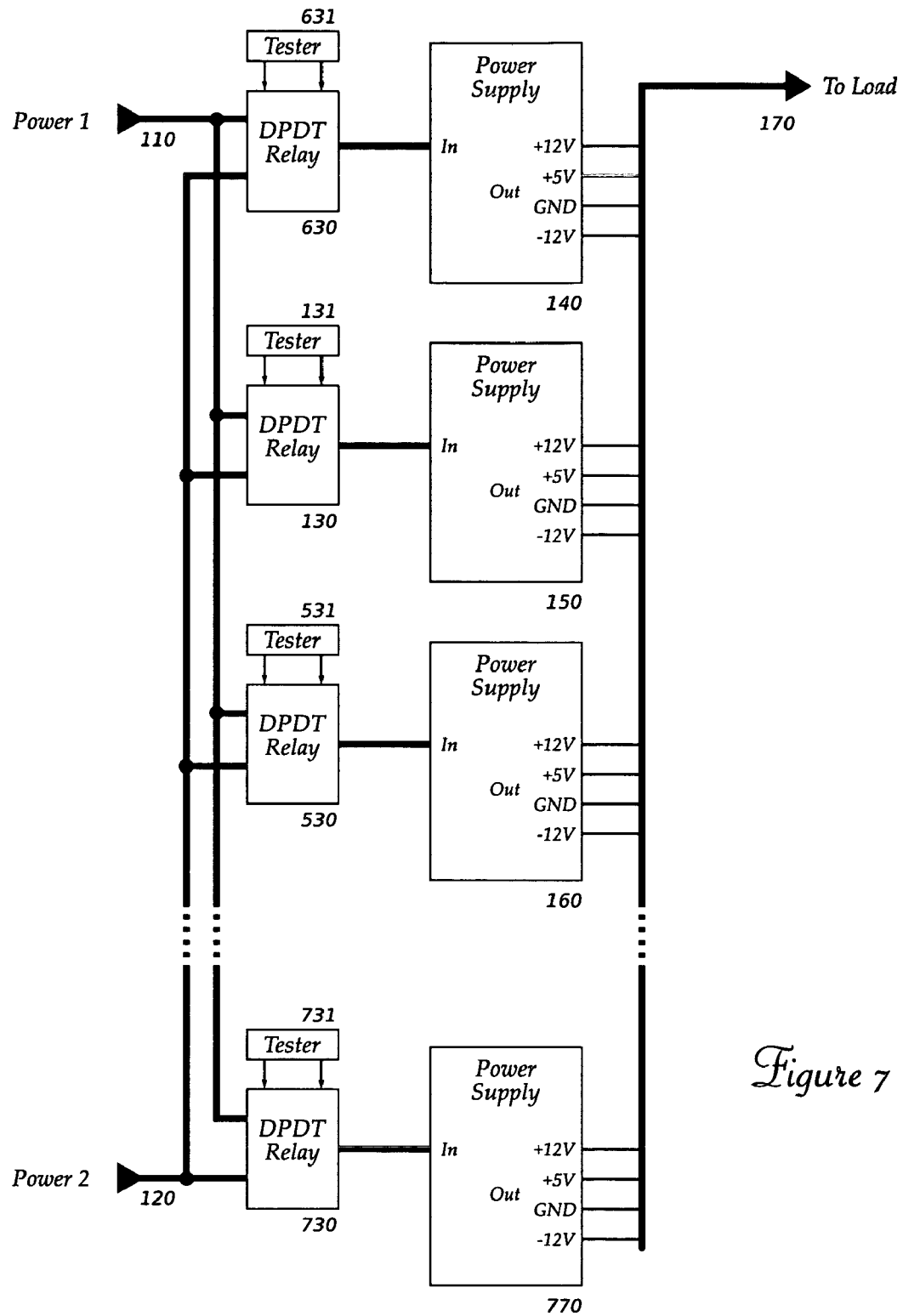
FIG. 7 shows another embodiment of the invention containing an arbitrary number of power supplies.

As shown in FIG. 7, embodiments of the invention may have an arbitrarily large number of power supplies, connected to two or more power sources. Cost, complexity, and diminishing reliability gains (and not any inherent limitations within the invention) set the upper bound on the number of power supplies and power connections that reasonably can be used in an embodiment. If identical power supplies are used, then continued operation in spite of failure of one or more supplies can be assured if the capacity of each supply is 1/N of the total required load power, where N is the minimum number of power supplies that must remain functional. For example, in a system that required at least five power supplies (out of a larger total number of supplies), each power supply should be rated at at least 20% of the total load current. If seven such supplies were installed, then the system could tolerate the failure of any two.

Redundant power supplies according to embodiments of the current invention are well-suited to provide reliable power for general- and special-purpose computing systems. Such systems can contain software to perform tests on their own hardware. For example, the testers shown as, e.g., element 131 of FIGS. 1 and 4-7, can be activated in response to a command from a program running on a computing system. The tester can provide a "pass/fail" indication of the state of the relay, and the system can produce a report or alarm to notify an operator of components that may need to be replaced.

Figure 8:
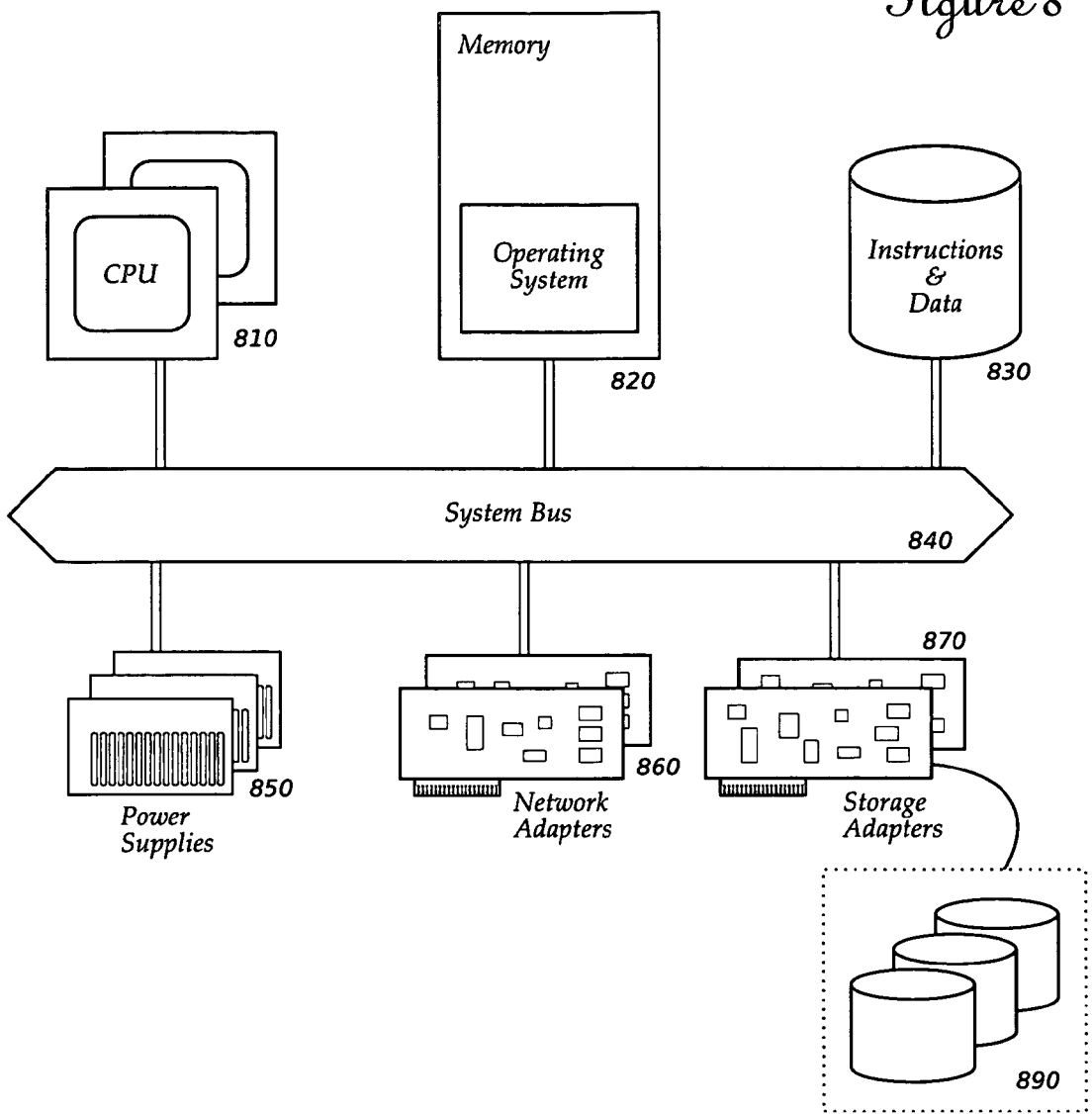
FIG. 8 shows a block diagram of a representative system where an embodiment of the invention might be used.

FIG. 8 shows a block diagram of a computing system with redundant power supplies according to an embodiment of the invention. Central processing units (CPU) 810 execute instructions stored in memory 820 in order to control and coordinate the operations of other devices attached to system bus 840. Storage device 830 may provide long-term storage for instructions and data not presently in use by the CPU(s). Network adapters 860 and storage adapters 870 (connected to storage devices 890) permit the system to communicate with other computer systems, and to provide services (for example, data storage and retrieval services) to other systems. Power supplies 850 may be configured according to an embodiment of the present invention, so that one (or more) of them may fail without adverse effect. Memory 820 may contain instructions (perhaps as a part of the indicated Operating System) to cause the CPUs to poll relay testers in power supplies 850 to detect and warn of failed relays. Polling may occur on a periodic schedule, for example, once per hour or once per other time period. Mechanical constraints imposed by the switching networks may place an upper bound on the frequency of these polling tests. For example, repeating the test every second or fraction of a second may result in spurious failure indications or increase the likelihood of switch failure. Warning may take the form of a visible or audible alarm, an electronic entry in a log, or a message sent via email or other method. Other warning mechanisms may be appropriate in some installations.

Instructions to cause a general- or special-purpose computing system to perform testing as described above may be stored on a machine-readable medium such as a disk drive, compact disk read-only memory (CDROM), magnetic tape, or other persistent memory device. Such instructions may also be transmitted to the computing system over a physical or virtual data connection.

The applications of the present invention have been described largely by reference to specific examples and in terms of particular allocations of functionality to certain hardware and/or software components. However, those of skill in the art will recognize that the methods can also be performed by software and hardware that distribute the functions of embodiments of this invention differently than herein described. Such variations and implementations are understood to be apprehended according to the following claims. It should be noted that references to "an" or "one" embodiment in this disclosure are not necessarily to the same embodiment, and such references mean "at least one."

We claim:

1. A redundant power supply apparatus comprising:
   a plurality of power inlets to supply electrical power in a first form;
   a plurality of power supplies to supply at least a minimum required power to a load, each power supply to convert electrical power from one of the power inlets to a second form;
   at least one steering network coupled to one power supply of the plurality of power supplies to connect one power inlet of the plurality of power inlets to the one power supply of the plurality of power supplies; and
   at least one tester coupled to the steering network to detect a failure of a connection in the steering network between the one of the plurality of power inlets and the one of the plurality of power supplies.

2. The apparatus of claim 1, wherein the failure of the steering network is a latent single-point failure.

3. The apparatus of claim 1, wherein more than one power supply of the plurality of power supplies and fewer than all power supplies of the plurality of power supplies can supply the minimum required power to the load.

4. The apparatus of claim 1, wherein a maximum power that any one of the plurality of power supplies can provide is less than the minimum required power.

5. The apparatus of claim 4, wherein the maximum power that one of the plurality of power supplies can provide is substantially equal to the minimum required power divided by an integer greater than one and less than the number of the plurality of power supplies.

6. The apparatus of claim 1, wherein the number of the plurality of power supplies is three (3).

7. The apparatus of claim 1, wherein one of the plurality of power supplies is coupled directly to one of the plurality of power inlets, and the other power supplies of the plurality of power supplies are coupled to the steering network.

8. The apparatus of claim 1, wherein each of the plurality of power supplies is coupled to a steering network of the steering network.

9. A system comprising:
   a computer system that requires a minimum operating power;
   a plurality of power supplies to supply at least the minimum operating power;
   a plurality of power connections to supply electrical power to each of the plurality of power supplies from substantially identical power sources, the number of power connections being less than the number of the plurality of power supplies;
   a switching device to connect one of the plurality of power supplies to one of the plurality of power connections; and
   a tester to detect a failure of a connection in the switching device between the one of the plurality of power supplies and the one of the plurality of power connections.

10. The system of claim 9 wherein the switching device is a field-replaceable unit.

11. The system of claim 9 wherein the switching device is a hot-swappable unit.

12. The system of claim 9, further comprising:

a memory to store instructions for the computer system that, when executed, cause the computer system to activate the tester and to report the failure.

13. The system of claim 12, wherein the computer system activates the tester periodically.

14. The system of claim 13, wherein a period for the tester activations is between one hour and one week.

15. A computer-readable storage medium containing instructions to control a computer having an interface to control and monitor a switching relay that connects a power supply to one of a plurality of power sources, the instructions comprising:

for each of the plurality of power sources, signaling the switching relay to connect the power supply to the power source;

testing the switching relay to determine whether there is a failure of a connection in the switching relay between the power supply and the one power source; and producing a fault notification if the switching relay failed to connect the power supply to the power source.

16. The computer readable storage medium of claim 15, further comprising instructions that cause the testing operation to occur according to a predetermined schedule.

17. The computer readable storage medium of claim 15, further comprising instructions that cause the computer to produce a warning notification in response to a failure of a connection in the switching relay between the power supply and the power source in the testing operation.

18. The computer readable storage medium of claim 17, wherein the warning notification is activation of one of a visual signal and an audible signal.

19. The computer readable storage medium of claim 17, wherein the warning notification is an electronic mail message.

* * * * *